United States Patent
Heinemann et al.

(10) Patent No.: US 6,819,073 B2
(45) Date of Patent: Nov. 16, 2004

(54) ACTIVE COMPENSATION OF MECHANICAL VIBRATIONS AND DEFORMATIONS IN INDUSTRIAL PROCESSING MACHINES

(75) Inventors: Gerhard Heinemann, Erlangen (DE); Wolfgang Papiernik, Neunkirchen (DE); Guido Stöppler, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 143 days.

(21) Appl. No.: 10/299,590

(22) Filed: Nov. 19, 2002

(65) Prior Publication Data

US 2003/0094915 A1 May 22, 2003

(30) Foreign Application Priority Data

Nov. 19, 2001 (DE) .......................... 101 56 781

(51) Int. Cl.[7] .................. G05B 11/18; G05B 19/23; B25J 9/10
(52) U.S. Cl. .................. 318/593; 318/568.17; 318/574
(58) Field of Search .......................... 318/593, 568.17, 318/574, 575, 625

(56) References Cited

U.S. PATENT DOCUMENTS

| | | | | |
|---|---|---|---|---|
| 4,812,725 A | * | 3/1989 | Chitayat | 318/625 |
| 5,459,381 A | * | 10/1995 | Itoh | 318/560 |
| 5,880,567 A | * | 3/1999 | Browne | 318/561 |
| 5,910,721 A | * | 6/1999 | Hayashi et al. | 318/649 |
| 5,977,736 A | * | 11/1999 | Nakazato | 318/568.17 |
| 6,147,468 A | * | 11/2000 | Hamamura et al. | 318/625 |
| 6,163,116 A | * | 12/2000 | Tanquary et al. | 318/66 |
| 6,232,736 B1 | * | 5/2001 | Bullen | 318/575 |
| 6,241,435 B1 | * | 6/2001 | Huang et al. | 409/141 |
| 6,430,465 B2 | * | 8/2002 | Cutler | 700/193 |
| 6,611,122 B2 | * | 8/2003 | Grohmann et al. | 318/569 |
| 6,653,810 B2 | * | 11/2003 | Lo | 318/569 |

FOREIGN PATENT DOCUMENTS

DE    196 20 439 C2    12/1996

* cited by examiner

Primary Examiner—Michael Sherry
Assistant Examiner—Patrick Miller
(74) Attorney, Agent, or Firm—Henry M. Feiereisen

(57) ABSTRACT

In a method for active compensation of mechanical vibrations and/or deformations in industrial processing machines, a main drive in a primary axis executes a first motion to move a mechanical machine element with an auxiliary drive in a secondary axis for execution of a second comparably more fine-tuned motion to move a machine point by the auxiliary drive in such a way that the movement of the machine point is composed of superimposed portions of the first and second motions. The first motion of the machine point moves hereby in accordance with a predetermined desired position value, and the second motion so compensates vibrations and/or deformation of the mechanical machine point that the machine point assumes the desired predetermined position.

25 Claims, 2 Drawing Sheets

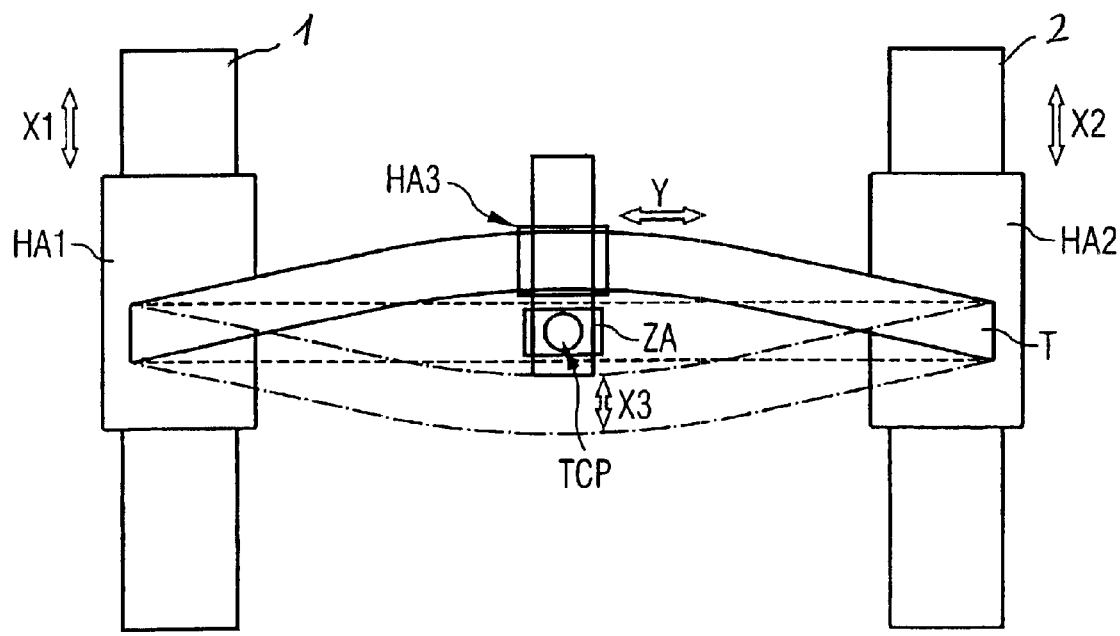

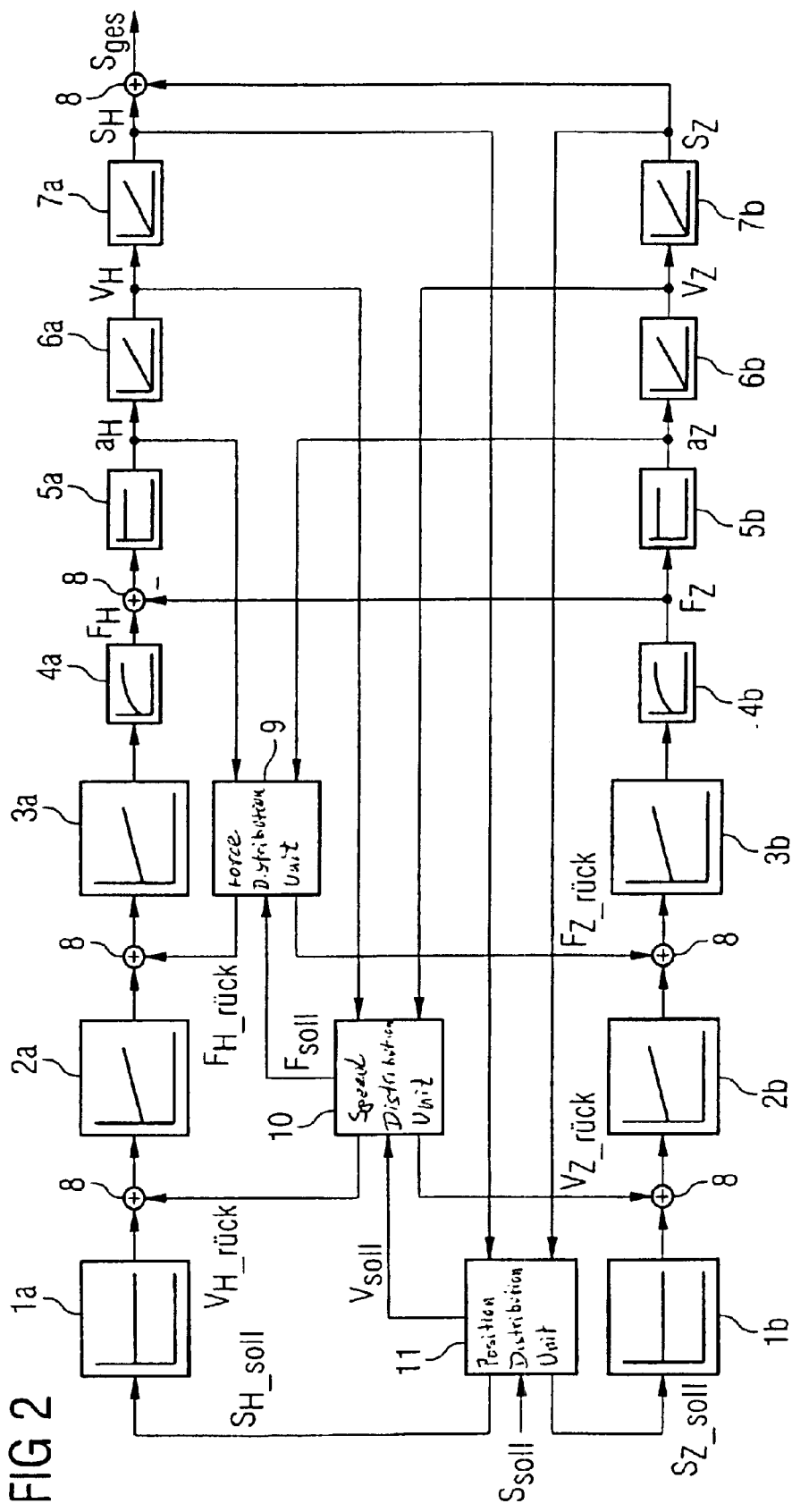

ACTIVE COMPENSATION OF MECHANICAL VIBRATIONS AND DEFORMATIONS IN INDUSTRIAL PROCESSING MACHINES

CROSS-REFERENCES TO RELATED APPLICATIONS

This application claims the priority of German Patent Application, Serial No. 101 56 781.2, filed Nov. 19, 2001, pursuant to 35 U.S.C. 119(a)–(d), the disclosure of which is incorporated herein by reference.

BACKGROUND OF THE INVENTION

The present invention relates to a method and device for active compensation of mechanical vibrations and/or deformations in industrial processing machines. The present invention further relates to an industrial processing machine which incorporates the novel and inventive device.

Industrial processing machines, in particular machine tools and robots, require highly dynamic and at the same time highly precise movement patterns. However, both requirements contradict one another because highly dynamic movements generate inertial forces which cause vibrations of the mechanical machine parts. During a material removing process, additional static deformations are encountered as a result of process forces. Both, inertial forces and static deformations, are in particular detrimental when the movement of bulky machine parts is involved and when there is a great distance between the drive motor and the position measuring system, on the one a hand, and the machine point (tool center point in case of machine tools) to be positioned, on the other hand.

Attempts to overcome this problem involve heretofore the use of very rigid mechanical machine components in addition to the use of heavy-duty drive and control units in order to minimize deformations and vibrations as excited by the inertial forces. A mechanical stiffness is normally attained by especially massive (thick-walled) or complicated (ribbed, braced) mechanical elements made of high-strength materials. Apart of the higher manufacturing costs for the mechanical parts, the higher mass is especially detrimental because it contradicts the need of highly dynamic movements and requires drives which must be designed more powerful.

As an alternative to the stiff mechanical construction, the application of so-called gantry machines has been proposed, in which the force generation is distributed within a movement direction over several drives. In this way, the drive forces can be spread more evenly for introduction into the mechanical construction and vibrations can be actively dampened at the attack points of the motor forces. Still, there remains the problem of a great distance between introduction points of the drive forces and the machine point to be positioned. Moreover, a gantry machine requires significantly more complex drive and control units.

It would therefore be desirable and advantageous to provide an improved method and device which obviate prior art shortcomings and which compensate undesired vibrations or mechanical deformations, without increase in the overall mass.

SUMMARY OF THE INVENTION

According to one aspect of the present invention, a method for active compensation of mechanical vibrations and/or deformations in industrial processing machines, includes the steps of providing at least one main drive in a primary axis for executing a first motion to move a mechanical machine element and combining the machine element in a secondary axis with an auxiliary drive which executes a comparably more fine-tuned second motion for so moving a machine point of the machine element that the movement of the machine point is composed of superimposed portions of the first and second motions, with the first motion moving the machine point in accordance with a predetermined desired position value, and with the second motion so compensating generated vibrations and/or a deformation of the mechanical machine element that the machine point still assumes the desired predetermined position.

The present invention resolves prior art problems relating to the development of inertial forces as a consequence of highly dynamic movements and thus the excitation of vibration of mechanical parts, by providing an auxiliary drive with small movement amplitude for actively compensating vibrations in the machine point, while still allowing a lightweight construction of the machine parts.

According to another feature of the present invention, the auxiliary drive is supplied with a separate control value which is commensurate with a desired position value and substantially corresponds to a deflection of the mechanical machine element with respect to an ideal rigid mechanical machine element.

Suitably, the control value for the auxiliary drive may be derived by directly measuring the position of the machine element in the machine point to be positioned for determining a vibration and/or deformation of the machine element. As an alternative, the control value for the auxiliary drive may also be derived through a differential measurement between non-vibrating and vibrating positions of the machine point for determining a vibration of the machine element. Another alternative involves an indirect measurement of an actual first acceleration and a pertaining non-vibrating second acceleration in the machine point to be positioned, and a comparison of the first and second accelerations for determining a vibration of the machine element.

According to another general feature of the present invention, at least one of the state variables—acceleration, speed, position—of the main drive and the auxiliary drive, may be ascertained, and a respective differential signal can then be derived therefrom for operating the auxiliary drive. In order to prevent the formation of a vibratory system, it would be beneficial to realize an acceleration measurement at a smallest possible phase loss. In the event of a presence of a phase loss during an acceleration measurement, the phase loss should be suitably compensated.

Since no stationary deflections occur in mechanical machine elements, such as an elastic traverse member, according to another feature of the present invention, a possible direct component of an ascertained relative acceleration may be eliminated through high-pass filtering.

The method according to the present invention is especially suitable for situations in which such a traverse member couples the secondary axis in a mechanically movable manner in parallel relationship to the primary axis.

According to another aspect of the present invention, a method for active compensation of control deviations in industrial processing machines, includes the steps of providing at least one main drive in a primary axis for executing a first motion to move in a secondary axis an auxiliary drive which executes a comparably more fine-tuned second motion for so moving a machine point to be positioned that the movement of the machine point is composed of superimposed portions of the first and second motions, with the first motion moving the machine point in accordance with a predetermined desired position value, and with the second motion so compensating control deviations of the main drive that the machine point still assumes the desired predetermined position.

Thus, the method according to the present invention is also applicable for active compensation of control deviations of the main drive by means of the auxiliary drive.

According to still another aspect of the present invention, a control device for active compensation of mechanical vibrations and/or deformations and/or control deviations in industrial processing machines, includes a first cascade-connected controller structure associated to at least one main drive and including a force controller, a superordinated speed controller and a position controller superordinated to the speed controller, a second cascade-connected controller structure associated to an auxiliary drive and including a force controller, a superordinated speed controller and a position controller superordinated to the speed controller, and at least one distribution unit selected from the group consisting of force distribution unit, speed distribution unit and position distribution unit, and configured to receive an input signal and to deliver an output signal for controlling a one of the controllers of the first cascade-connected controller structure and an equivalent one of the controllers of the second cascade-connected controller structure.

The force distribution unit may be configured hereby to receive as input an actual acceleration value of the main drive and an actual acceleration value of the auxiliary drive, and/or a desired overall force value provided from the speed distribution unit, and to output respective relative acceleration signals for delivery to an input of the force controller of the first cascade-connected controller structure and the force controller of the second cascade-connected controller structure.

The speed distribution unit may be configured hereby to receive as input an actual speed value of the main drive and an actual speed value of the auxiliary drive, and/or a desired overall speed value from the position distribution unit, and to output respective relative speed signals for delivery to an input of the speed controller of the first cascade-connected controller structure and the speed controller of the second cascade-connected controller structure.

The position distribution unit may be configured hereby to receive as input an actual position value of the main drive and an actual position value of the auxiliary drive, and a desired overall position value, and to output respective relative position signals for delivery to an input of the position controller of the first cascade-connected controller structure and the position controller of the second cascade-connected controller structure.

According to another feature of the present invention, there may be provided a high-pass filter for eliminating a possible direct component of the input signal.

According to yet another aspect of the present invention, an industrial processing machine includes a main drive positioned on a primary axis and carrying out a first motion, a mechanical machine element moved by the main drive and including an auxiliary drive positioned on a secondary axis and constructed for executing a second comparably more fine-tuned motion for movement of a machine point to be positioned, a first cascade-connected controller structure for operating the main drive, and a second cascade-connected controller structure for operating the auxiliary drive, wherein the movement of the machine point is a composed of superimposed portions of the first and second motions.

According to another feature of the present invention, there may be provided a traverse member for linkage of the secondary axis in parallel relationship to the primary axis in a mechanically movable manner. In the event of an arrangement of two main drives with two primary axes, a traverse member may be provided for coupling the main drives, wherein the secondary axis is positioned between both primary axes in parallel relationship thereto and supported by the traverse member. Suitably, the auxiliary drive is hereby configured as double-sided linear drive.

Regardless whether the traverse member is provided to maintain a parallelism between the secondary axis and the primary axis or to position the secondary axis between both primary axes in parallel relationship, it is advantageous to so mechanically construct the traverse member as to reversibly absorb support forces required for process forces when the traverse member is deflected.

The present invention resolves prior art shortcomings by allowing the use of lightweight elements with respective vibrations while actively compensating the encountered vibrations by an auxiliary drive with smaller movement amplitude in the machine point to be positioned. Vibrations may hereby be ascertained either through direct measurement of the position or indirectly via an acceleration measurement in the machine point to be positioned. There are many advantages realized by the present invention:

- the simple and lightweight construction of the mechanical components results in material saving, simplified manufacture and simplified construction;
- as a consequence of the material saving aspect, the moving machine parts of the main drive of the primary axis can be made of weaker construction;
- the auxiliary drive travels only a movement path in the millimeter range and is not required to accelerate heavy machine parts, so that the auxiliary drive can be constructed of small size and in immediate proximity of the machine point to be positioned to enable a greatest possible compensation effect;
- only the small auxiliary drive is required to control the frequency range of the mechanical vibrations;
- control deviations of the more powerful main drive may also be compensated by the small auxiliary drive;
- in the event no static deformations (e.g., by weight forces and process forces) have to be compensated but compensation of only vibrations is desired, the vibrations may be detected by acceleration sensors so that the overall mechanical construction is especially simple.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic, exemplified mechanical arrangement for a processing machine according to the present invention with a gantry machine; and FIG. 2 is a block diagram of a control structure according to the present invention for operating the mechanical arrangement of FIG. 1.

DETAILED DESCRIPTION OF PREFERRED EMBODIMENTS

Throughout all the Figures, same or corresponding elements are generally indicated by same reference numerals.

These depicted embodiments are to be understood as illustrative of the invention and not as limiting in any way.

Turning now to the drawing, and in particular to FIG. 1, there is shown a schematic, exemplified mechanical arrangement for a processing machine according to the present invention with a gantry machine for performing machining work on a workpiece (not shown). The gantry machine has uprights 1 and 2. Main drives HA1, HA2, operatively connected to respective tool-carrying machining heads (not shown), are respectively mounted to the uprights 1, 2, for movement along respective primary axes X1 and X2 in parallel relationship, and are mechanically coupled by a traverse member T which supports a further main drive HA3 for movement in Y-direction, defined by primary axis Y, in a direction perpendicular to the primary axes X1, X2. The main drives HA1, HA2 are hereby constructed for carrying out a "coarse" motion. A more "fine-tuned" motion in the same direction is realized by an auxiliary drive ZA which is positioned in immediate proximity of a machine point TCP for movement of the machine point TCP in X-direction defined by a secondary axis X3. The auxiliary drive ZA is located on the primary axis Y for positioning the machine point TCP in a direction parallel to the primary axes X1, X2.

The movement of an axis of the machine is thus composed of two superimposed portions: a "coarse" motion as traveled by the large machine parts, and a more "fine-tuned" motion for movement of only the machine point TCP to be positioned and thereby to realize the required precision. The auxiliary drive ZA is hereby used to actively compensate encountered vibrations. This can be realized by a measuring process to ascertain the vibrations, which may involve:

direct measurement of a vibration, differential measurement between non-vibrating and vibrating positions, indirect measurement via the acceleration in the machine point to be positioned, and comparison with the non-vibrating acceleration, or a combination of these measuring processes.

As a consequence of an acceleration of inert masses such as in the machine point TCP (e.g. with a milling head etc.), the traverse member T sags. The secondary axis X3 compensates the deflection of the machine point TCP from an ideal rigid traverse member, indicated in broken line in FIG. 1. A subsequent braking operation causes an overswing, indicated in dashdot line in FIG. 1 and composed of the superimposition of the eigenmodes of the traverse member T which oscillates with the respective natural frequencies.

In particular low-frequency eigenmodes can be compensated by a method according to the present invention. The use of a highly dynamic double sided direct linear drive as X3 axis enables also a compensation of vibrations of mean frequency. Hereby, it should be taken into account that the support force of the auxiliary drive ZA with respect to the traverse member T can no longer be ignored. A force distribution unit is hereby provided to dampen the elastic traverse member.

Otherwise, it is the advantage of a moving secondary part and stationery primary parts that the secondary axis X3 only moves comparably small masses so that the support forces against the traverse member may be ignored if the accelerations upon the secondary axis X3 are not too great so that only low frequencies have to be compensated. In the event, the support forces cannot be ignored, e.g., when the auxiliary drive has to move great masses along a Z-axis, measures should be taken that the auxiliary drive ZA does not excite the traverse member T to vibrate. Therefore, this drive concept is especially advantageous for application with machine tools without distinct Z-axis with small masses to be moved, e.g., laser cutting machines.

In the presence of process forces (e.g. during a material removing operation), the lightweight traverse member T is constructed to reversibly absorb the support forces when being deflected.

The auxiliary drive ZA is positioned by ascertaining at least one of the three state variables—acceleration, speed and position—of the main drive and the auxiliary drive. The state variables may hereby be measured absolutely or relatively. Turning now to FIG. 2, there is shown a block diagram of a control structure having two cascade-type controller structures, with one controller structure representing the upper arm and relating to both main drives HA1, HA2, and with the other controller structure representing the lower arm and relating to the auxiliary drive ZA.

Each of the cascade-type controller structures includes a position controller 1a for the main drive and position controller 1b for the auxiliary drive, respective speed controllers 2a, 2b, and respective force controllers 3a, 3b. A desired overall position value $S_{Soll}$ is preset, e.g., by a numeric control, and supplied to a position distribution unit 11. The position distribution unit 11 calculates the desired position value $S_{H\_Soll}$ for the main drives HA1, HA2 and the desired position value $S_{Z\_Soll}$ for the auxiliary drive ZA, and, optionally, a desired overall speed value $V_{Soll}$ for a speed distribution unit 10. Hereby, actual position values $S_H$ and $S_Z$ from the main drives and the auxiliary drive are fed back to the position distribution unit 11.

Following the same concept, the speed distribution unit 10 computes the feedback value $V_{H\_rück}$ for the main drives HA1, HA2 and the feedback value $V_{Z\_rück}$ for the auxiliary drive ZA, and optionally, a desired overall force value $F_{Soll}$ for a force distribution unit 9. Hereby, actual speed values $V_H$ and $V_Z$ are fed back to the speed distribution unit 10. Likewise, the force distribution unit 9 computes the force feedback value $F_{H\_rück}$ for the main drives HA1, HA2 and the feedback value $F_{Z\_rück}$ for the auxiliary drive ZA. Hereby, actual acceleration values $a_H$ and $a_Z$ are respectively inputted to the force distribution unit 9.

Instead of transmitting only the desired overall position value $S_{Soll}$ of the numeric control to the position distribution unit 11, a speed pilot signal and, optionally, a force pilot signal may be inputted to the subordinated distribution units 10, 9. Alternatively, it is also possible to omit input of the desired overall speed value $V_{Soll}$ and the desired overall force value $F_{Soll}$ altogether to the distribution units 10, 9, respectively.

The force controllers 3a, 3b generate on their output side a set value for the respective drives. Elements 4a, 4b, 5a, 5b, 6a, 6b, 7a, 7b designate the respective controlled system. Hereby, the delay of the respective drive is defined by a PT1 element 4a, 4b (actual force value $F_H$ and $F_Z$, respectively, on the output side). System amplification, i.e., the inverse mass at translatory drives and, is represented by the P element 5a, 5b. The first integrator stage 6a, 6b, respectively, integrates the respective actual acceleration value to the actual speed value ($V_H$ and $V_Z$, respectively), which, in turn, is integrated by the second integrator stage 7a, 7b, respectively, to the respective actual position value ($S_H$ and $S_Z$, respectively). The actual position values $S_H$ and $S_Z$, present in their own coordinate system, are combined in an adder 8 to provide an overall position value $S_{ges}$.

There are several possibilities to control the auxiliary drive ZA in accordance with the present invention. The configurations referred to hereinafter represent only examples and should by no means viewed in as an exhaustive list of possible examples to control the auxiliary drive according to the present invention.

The auxiliary drive ZA may be operated solely by a force controller. The desired force value $F_{Z\_Soll}$ for the auxiliary drive ZA is hereby equated to the actual force value $F_H$ of the main drives HA1, HA2. This is identical to the requirement that the relative actual force value $F_H-F_Z$ is controlled to zero.

Assuming that the eigenmode with lowermost frequency of a very light traverse member T is at f=10 Hz, and the traverse member T is accelerated at 20 m/sec², to thereby effect an amplitude of the deflection of the traverse member T of ŝ=100 μm, a maximum acceleration is established of:

$$â=ŝ\cdot 4\cdot\pi^2\cdot f^2=0.395 \text{ m/sec}^2.$$

This acceleration of the undesired vibration is superimposed over the wanted acceleration, which normally is much higher. An acceleration sensor should be used here which is able to resolve the entire acceleration range at sufficient accuracy for a significantly smaller acceleration of the undesired vibrations. The phase loss of the acceleration measurement should hereby be as small as possible or compensated because otherwise the result is an oscillatory system. Piezosensors have very high dynamics and thus are especially suitable for carrying out the measurements as described further above.

When the traverse member T is elastic, no stationary deflections will be encountered so that the direct component of the relative acceleration signal has to be eliminated, e.g. by a high-pass filter. As a consequence, the speed controller 2b and the position controller 1b may be omitted altogether and only the acceleration controller 3b may be used with desired value zero for the relative acceleration.

As an alternative, it is also conceivable to measure the deflection of the traverse member T with a laser, secured to a carriage of the X1 or X2 axis, and a photodiode arrangement on the moving part of the X3 axis. The deflection can then be used directly as desired position value for the secondary axis and in ideal situation is identical to the deflection of the traverse member T relative to an ideal rigid traverse member.

Alternatively, the deflection may also be established as relative signal between the absolute actual position value $S_H$ of the primary axes HA1, HA2 and the absolute actual position value $S_Z$ of the secondary axis X3.

In the event, the deflection signal has sufficient resolution, numeric differentiation of a speed signal can be computed for the subordinated distribution unit. Of course, a combination of both embodiments is also feasible. In this case, all three distribution units 9, 10, 11 are used.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for active compensation of mechanical vibrations and/or deformations in industrial processing machines, comprising the steps of:

providing at least one main drive in a primary axis for executing a first motion to move a mechanical machine element;

combining the machine element in a secondary axis with an auxiliary drive which executes a comparably more fine-tuned second motion for so moving a machine point of the machine element that the movement of the machine point is composed of superimposed portions of the first and second motions, with the first motion moving the machine point in accordance with a predetermined desired position value, and with the second motion so compensating generated vibrations and/or a deformation of the mechanical machine element that the machine point still assumes the desired predetermined position, and ascertaining at least one state variable selected from the group consisting of acceleration, speed, and position, of the main drive and the auxiliary drive, and deriving therefrom a respective differential signal for controlling the auxiliary drive.

2. The method of claim 1, and further comprising the step of controlling the auxiliary drive by inputting a separate control value commensurate with a desired position value and substantially corresponding to a deflection of the mechanical machine element with respect to an ideal rigid mechanical machine element.

3. The method of claim 2, and further comprising the step of deriving the control value through direct measurement of the position of the machine element in the machine point to be positioned for determining a vibration and/or deformation of the machine element.

4. The method of claim 2, and further comprising the step of deriving the control value through differential measurement between non-vibrating and vibrating positions of the machine point for determining a vibration of the machine element.

5. The method of claim 2, and further comprising the step of deriving the control value through indirect measurement of an actual first acceleration and a pertaining non-vibrating second acceleration in the machine point to be positioned, and comparison of the first and second accelerations for determining a vibration of the mechanical machine element.

6. The method of claim 5, wherein the measurement of the first acceleration and the second acceleration is implemented at a smallest possible phase loss.

7. The method of claim 5, and further comprising the step of compensating a phase loss during measurement of the first acceleration and the second acceleration.

8. The method of claim 5, and further comprising the step of eliminating a possible direct component of an ascertained relative acceleration through high-pass filtering.

9. The method of claim 1, wherein the acceleration measurement is implemented at a smallest possible phase loss.

10. The method of claim 1, and further comprising the step of compensating a phase loss during acceleration measurement.

11. The method of claim 1, and further comprising the step of eliminating a possible direct component of an ascertained relative acceleration through high-pass filtering.

12. The method of claim 6, wherein the secondary axis is coupled in a mechanically movable manner in parallel relationship to the primary axis by a traverse member.

13. A method for active compensation of control deviations in industrial processing machines comprising the steps of providing at least one main drive in a primary axis for executing a first motion to move in a secondary axis an auxiliary drive which executes a comparably more fine-tuned second motion for so moving a machine point to be positioned that the movement of the machine point is composed of superimposed portions of the first and second motions, with the first motion moving the machine point in accordance with a predetermined desired position value, and with the second motion so compensating control deviations of the main drive that the machine point still assumes the desired predetermined position, and ascertaining at least one state variable selected from the group consisting of acceleration, speed, and position, of the main drive and the auxiliary drive, and deriving therefrom a respective differential signal for controlling the auxiliary drive.

14. The method of claim 13, wherein the ascertaining step is an acceleration measurement, at a smallest possible phase loss.

15. The method of claim 13, wherein the ascertaining step is an acceleration measurement, and further comprising the step of compensating a phase loss during the acceleration measurement.

16. The method of claim 13, and further comprising the step of eliminating a possible direct component of an ascertained relative acceleration through high-pass filtering.

17. The method of claim 13, wherein the secondary axis is coupled in a mechanically movable manner in parallel relationship to the primary axis by a traverse member.

18. A control device for active compensation of mechanical vibrations and/or deformations and/or control deviations in industrial treatment machines, comprising:
    a first cascade-connected controller structure associated to at least one main drive and including a force controller, a superordinated speed controller and a position controller superordinated to the speed controller;
    a second cascade-connected controller structure associated to an auxiliary drive and including a force controller, a superordinated speed controller and a position controller superordinated to the speed controller; and
    at least one distribution unit selected from the group consisting of force distribution unit, speed distribution unit and position distribution unit,
        wherein the force distribution unit is configured to receive on an input side at least one input signal selected form the group consisting of two actual acceleration values of the main drive and the auxiliary drive, and a desired overall force value from the speed distribution unit, and to output respective relative acceleration signals for delivery to an input side of the force controller of the first cascade-connected controller structure and to an input side of the force controller of the second cascade-connected controller structure,
        wherein the speed distribution unit has an input side for receiving at least one input signal selected from the group consisting of two actual speed values of the main drive and the auxiliary drive, and a desired overall speed value of the position distribution unit, and to output respective relative speed signals for delivery to an input of the speed controller of the first cascade-connected controller structure and the speed controller of the second cascade-connected controller structure
        wherein the position distribution unit is configured to receive on the input side two actual position values of the main drive and the auxiliary drive and a desired overall position value, and to output respective relative position signals for delivery to an input of the position controller of the first cascade-connected controller structure and the position controller of the second cascade-connected controller structure.

19. The control device of claim 18, and further comprising a high-pass filter for eliminating a possible direct component in the input signal.

20. An industrial processing machine comprising:
    at least one main drive positioned on a primary axis and carrying out a first motion;
    a mechanical machine element moved by the main drive and including an auxiliary drive positioned on a secondary axis and constructed for executing a second comparably more fine-tuned motion for movement of a machine point to be positioned, wherein the movement of the machine point is composed of superimposed portions of the first and second motions;
    a first cascade-connected controller structure for operating the main drive; and
    a second cascade-connected controller structure for operating the auxiliary drive; and
    a second main drive to thereby include two main drives with two primary axes, and a traverse member for coupling the main drives, wherein the secondary axis is positioned between both primary axes in parallel relationship thereto and supported by the traverse member.

21. The industrial processing machine of claim 20, and further comprising a traverse member for linkage of the secondary axis in parallel relationship to the primary axis in a mechanically movable manner.

22. The industrial processing machine of claim 20, wherein the auxiliary drive is configured as double-sided linear drive.

23. An industrial processing machine comprising:
    at least one main drive positioned on a primary axis and carrying out a first motion;
    a mechanical machine element moved by the main drive and including an auxiliary drive positioned on a secondary axis and constructed for executing a second comparably more fine-tuned motion for movement of a machine point to be positioned, wherein the movement of the machine point is composed of superimposed portions of the first and second motions;
    a first cascade-connected controller structure for operating the main drive;
    a second cascade-connected controller structure for operating the auxiliary drive; and
    a traverse member for linkage of the secondary axis in parallel relationship to the primary axis in a mechanically movable manner, wherein the traverse member is so mechanically constructed as to reversibly absorb support forces required for process forces, when the traverse member is deflected.

24. The industrial processing machine of claim 23, wherein the auxiliary drive is configured as double-sided linear drive.

25. A control device for active compensation of mechanical vibrations and/or deformations and/or control deviations in industrial processing machines, comprising:
    a first cascade-connected controller structure associated to at least one main drive and including a force controller, a superordinated speed controller and a position controller superordinated to the speed controller;
    a second cascade-connected controller structure associated to an auxiliary drive and including a force controller, a superordinated speed controller and a position controller superordinated to the speed controller; and at least one distribution unit selected from the group consisting of force distribution unit, speed distribution unit and position distribution unit, and configured to receive an input signal and to deliver an output signal for controlling one of the controllers of the first cascade-connected controller structure and an equivalent one of the controllers of the second cascade-connected controller structure.

* * * * *